United States Patent
Viswanathan

(10) Patent No.: US 11,290,326 B2
(45) Date of Patent: *Mar. 29, 2022

(54) METHOD AND APPARATUS FOR REGULATING RESOURCE CONSUMPTION BY ONE OR MORE SENSORS OF A SENSOR ARRAY

(71) Applicant: HERE Global B.V., Eindhoven (NL)

(72) Inventor: Anirudh Viswanathan, Berkeley, CA (US)

(73) Assignee: HERE GLOBAL B.V., Eindhoven (NL)

( * ) Notice: Subject to any disclaimer, the term of this patent is extended or adjusted under 35 U.S.C. 154(b) by 0 days.

This patent is subject to a terminal disclaimer.

(21) Appl. No.: 17/115,389

(22) Filed: Dec. 8, 2020

(65) Prior Publication Data

US 2021/0092014 A1  Mar. 25, 2021

Related U.S. Application Data

(63) Continuation of application No. 16/229,374, filed on Dec. 21, 2018, now Pat. No. 10,887,169.

(51) Int. Cl.
*G06F 15/173* (2006.01)
*H04L 41/0816* (2022.01)
*H04L 67/12* (2022.01)

(52) U.S. Cl.
CPC .......... *H04L 41/0816* (2013.01); *H04L 67/12* (2013.01)

(58) Field of Classification Search
CPC ............... H04L 41/0816; H04L 67/12
See application file for complete search history.

(56) References Cited

U.S. PATENT DOCUMENTS 9,720,412 B1  8/2017  Zhu et al.
2006/0219861 A1  10/2006  Wood
(Continued)

FOREIGN PATENT DOCUMENTS

DE  102016202569 A1  8/2017
EP  2 938 060 A1  10/2015
(Continued)

OTHER PUBLICATIONS

U.S. Appl. No. 16/229,374, filed Dec. 21, 2018, U.S. Pat. No. 10,887,169, Issued.
(Continued)

*Primary Examiner* — Wing F Chan
*Assistant Examiner* — Joseph R Maniwang
(74) *Attorney, Agent, or Firm* — Alston & Bird LLP

(57) ABSTRACT

A method is provided for dynamically throttling processing and memory consumption of sensors based on context. Methods may include: receiving first sensor data from a first sensor, where the first sensor data includes data associated with an environment of the sensor; applying an auto-encoder framework to the first sensor data to establish a data difference score between frames of the first sensor data, where a relatively high data difference score corresponds to substantial differences between frames of the first sensor data, and wherein a relatively low data difference score corresponds to insubstantial differences between frames of the first sensor data; reducing a frame rate of data capture of the first sensor in response to the data difference score between frames of the first sensor data being relatively low; capturing first sensor data from the first sensor at the reduced frame rate; and providing for storage of the first sensor data.

21 Claims, 3 Drawing Sheets

(56) References Cited

U.S. PATENT DOCUMENTS

| | | |
|---|---|---|
| 2013/0103348 A1 | 4/2013 | Cao et al. |
| 2014/0002730 A1 | 1/2014 | Thomson |
| 2014/037135 A1 | 2/2014 | Kutliroff |
| 2015/0271493 A1 | 9/2015 | Okazaki |
| 2015/0334298 A1 | 11/2015 | Zhang |
| 2016/0286127 A1 | 9/2016 | Zhao |
| 2017/0031363 A1* | 2/2017 | Laur ..................... G05D 1/024 |
| 2020/0089993 A1 | 3/2020 | Hollander |

FOREIGN PATENT DOCUMENTS

| | | |
|---|---|---|
| JP | 2004 200989 A | 7/2004 |
| WO | WO 2006/018951 A1 | 2/2006 |

OTHER PUBLICATIONS

Extended European Search Report for Application No. 19217424.1 dated Jul. 27, 2020, 17 pages.
Machine Learning's Next Trick is Generating Videos from Photos [online] [retrieved Feb. 12, 2019], Retrieved from the Internet: <URL: https://www.theverge.com/2016/9/12/12886698/machine-learning-video-image-prediction-mit>. (dated Sep. 12, 2016) 3 pages.
Office Action for U.S. Appl. No. 16/229,374 dated Apr. 27, 2020.
Notice of Allowance for U.S. Appl. No. 16/229,374 dated Sep. 8, 2020.

* cited by examiner

METHOD AND APPARATUS FOR REGULATING RESOURCE CONSUMPTION BY ONE OR MORE SENSORS OF A SENSOR ARRAY

CROSS-REFERENCE TO RELATED APPLICATIONS

This application is a continuation of and claims priority to U.S. patent application Ser. No. 16/229,374, filed on Dec. 21, 2018, the contents of which are hereby incorporated by reference in their entirety.

TECHNOLOGICAL FIELD

Example embodiments of the present invention relate generally to regulating resource consumption by one or more sensors of a sensor array, and more particularly, to dynamically throttling processing and memory consumption of sensors based on context.

BACKGROUND

Vehicles continue to advance from manually driven vehicles with minimal electronic control to highly advanced vehicles with varying degrees of autonomy and sophisticated electronic controls to facilitate autonomous vehicle control. As vehicles become more advanced, the features become more complex and power consumption of components not directly related to propelling the vehicle increase substantially.

Vehicles with varying degrees of autonomy, from blind-spot monitoring, lane-keep assist, electronic braking assistance, etc. to full autonomous control require sensor arrays that monitor vehicle surroundings and communicate information to a vehicle control module. These sensor arrays may perform a wide variety of functions that are supplanting manual vehicle control. Further, the sensors may be used to map an environment of the vehicle to help build and repair road maps and road geometry modelling.

Road geometry modelling is very useful for three dimensional (3D) map creation and 3D terrain identification along with feature and obstacle detection in environments, each of which may facilitate autonomous vehicle navigation along a prescribed path. Such road geometry modelling, while useful, consumes large amounts of processing capacity while also having substantial memory and storage requirements. As vehicles become more advanced and capable of tasks that are resource intensive, resource management becomes critical.

BRIEF SUMMARY

Accordingly, a method, apparatus, and computer program product are provided for regulating resource consumption by one or more sensors of a sensor array, and more particularly, to dynamically throttling processing and memory consumption of sensors based on context. Embodiments provided herein may include an apparatus including at least one processor and at least one non-transitory memory including computer program code instructions. The computer program code instructions may be configured to, when executed, cause the apparatus to: receive first sensor data from a first sensor of a first sensor type, where the first sensor data includes data associated with an environment of the first sensor; apply an auto-encoder framework to the first sensor data to establish a data difference score between frames of the first sensor data, where a relatively high data difference score corresponds to substantial differences between frames of the first sensor data, and where a relatively low data difference score corresponds to insubstantial differences between frames of the first sensor data; reduce a frame rate of data capture of the first sensor in response to the data difference score between frames of the first sensor data being relatively low; capture first sensor data from the first sensor at the reduced frame rate; and provide for storage of the first sensor data.

The apparatus of example embodiments may be caused to: apply the auto-encoder framework to establish a data difference sore between frames of the first sensor data captured at the reduced frame rate; and increase a frame rate of data capture of the first sensor in response to the data difference score between frames of the first sensor data captured at the reduced frame rate being relatively high. The apparatus may be caused to reduce a resolution of data capture of the first sensor in response to the data difference score between frames of the first sensor data being relatively low. The apparatus may be caused to: apply the auto-encoder framework to establish a data difference score between frames of the first sensor data captured at the reduced resolution; and increase a resolution of data capture of the first sensor in response to the data difference score between frames of the first sensor data captured at the reduced frame rate being relatively high.

According to some embodiments, causing the apparatus to reduce a frame rate of data capture of the first sensor in response to the data difference score between frames of the first sensor data being relatively low may include causing the apparatus to reduce a frame rate of data capture of the first sensor in response to receiving an indication of reduced power availability. A data difference score between frames of the first sensor data may be established, where causing the apparatus to reduce a frame rate of data capture of the first sensor in response to the data difference score between frames of the first sensor data being relatively low may include causing the apparatus to reduce a frame rate of data capture of the first sensor in response to the data difference score between frames of the first sensor data failing to satisfy a predetermined value. The apparatus may be caused to increase the predetermined value in response to receiving an indication to reduce power consumption.

Embodiments provided herein may include a computer program product including at least one non-transitory computer-readable storage medium having computer-executable program code instructions stored therein. The computer-executable program code instructions may include program code instructions to: receive first sensor data from a first sensor, where the first sensor data includes data associated with an environment of the first sensor; apply an auto-encoder framework to the first sensor data to establish a data difference score between frames of the first sensor data, where a relatively high data difference score corresponds to substantial differences between frames of the first sensor data and wherein a relatively low data difference score corresponds to insubstantial differences between frames of the first sensor data; reduce a frame rate of data capture of the first sensor in response to the data difference score between frames of the first sensor data being relatively low; capture first sensor data from the first sensor at the reduced frame rate; and provide for storage of the first sensor data.

Embodiments may include program code instructions to: apply the auto-encoder framework to establish a data difference score between frames of the first sensor data captured at the reduced frame rate; and increase a frame rate of data capture of the first sensor in response to the data difference score between frames of the first sensor data captured at the reduced frame rate being relatively high. Embodiments may include program code instructions to reduce a resolution of data capture of the first sensor in response to the data difference score between frames of the first sensor being relatively low. Embodiments may include program code instructions to: apply the auto-encoder framework to establish a data difference score between frames of the first sensor data captured at the reduced resolution; and increase a resolution of data capture of the first sensor in response to the data difference score between frames of the first sensor data captured at the reduced frame rate being relatively high.

According to some embodiments, the program code instructions to reduce a frame rate of data capture of the first sensor in response to the data difference score between frames of the first sensor data being relatively low may include program code instructions to reduce a frame rate of data capture of the first sensor in response to receiving an indication of reduced power availability. A data difference score between frames of the first sensor data may be established, where the program code instructions to reduce a frame rate of data capture of the first sensor in response to the data difference score between frames of the first sensor data being relatively low may include program code instructions to reduce a frame rate of data capture of the first sensor in response to the data difference score between frames of the first sensor data failing to satisfy a predetermined value. The predetermined value may be increased in response to receiving an indication to reduce power consumption.

Embodiments described herein may provide a method including: receiving first sensor data from a first sensor, where the first sensor data includes data associated with an environment of the first sensor; applying an auto-encoder framework to the first sensor data to establish a data difference score between frames of the first sensor data, where a relatively high data difference score corresponds to substantial differences between frames of the first sensor data, and wherein a relatively low data difference score corresponds to insubstantial differences between frames of the first sensor data; reducing a frame rate of data capture of the first sensor in response to the data difference score between frames of the first sensor data being relatively low; capturing first sensor data from the first sensor at the reduced frame rate; and providing for storage of the first sensor data.

Methods may include applying the auto-encoder framework to establish a data difference score between frames of the first sensor data captured at the reduced frame rate; and increasing a frame rate of data capture of the first sensor in response to the data difference score between frames of the first sensor data captured at the reduced frame rate being relatively high. Methods may include reducing a resolution of data capture of the first sensor in response to the data difference score between frames of the first sensor data being relatively low. Methods may include: applying the auto-encoder framework to establish a data difference score between frames of the first sensor data captured at the reduced resolution; and increasing a resolution of data capture of the first sensor in response to the data difference score between frames of the first sensor data captured at the reduced frame rate being relatively high.

According to some embodiments, reducing a frame rate of data capture of the first sensor in response to the data difference score between frames of the first sensor data being relatively low may include reducing a frame rate of data capture of the first sensor in response to receiving an indication of reduced power availability. A data difference score between frames of the first sensor data may be established, where reducing the frame rate of data capture of the first sensor in response to the data difference score between frames of the first sensor data being relatively low may include reducing a frame rate of data capture of the first sensor in response to the data difference score between frames of the first sensor data failing to satisfy a predetermined value in response to receiving an indication to reduce power consumption.

Embodiments described herein may provide an apparatus including: means for receiving first sensor data from a first sensor, where the first sensor data includes data associated with an environment of the first sensor; means for applying an auto-encoder framework to the first sensor data to establish a data difference score between frames of the first sensor data, where a relatively high data difference score corresponds to substantial differences between frames of the first sensor data, and wherein a relatively low data difference score corresponds to insubstantial differences between frames of the first sensor data; means for reducing a frame rate of data capture of the first sensor in response to the data difference score between frames of the first sensor data being relatively low; means for capturing first sensor data from the first sensor at the reduced frame rate; and means for providing for storage of the first sensor data.

An example apparatus may include: means for applying the auto-encoder framework to establish a data difference score between frames of the first sensor data captured at the reduced frame rate; and means for increasing a frame rate of data capture of the first sensor in response to the data difference score between frames of the first sensor data captured at the reduced frame rate being relatively high. An apparatus may include means for reducing a resolution of data capture of the first sensor in response to the data difference score between frames of the first sensor data being relatively low. An apparatus may include: means for applying the auto-encoder framework to establish a data difference score between frames of the first sensor data captured at the reduced resolution; and means for increasing a resolution of data capture of the first sensor in response to the data difference score between frames of the first sensor data captured at the reduced frame rate being relatively high.

According to some embodiments, the means for reducing a frame rate of data capture of the first sensor in response to the data difference score between frames of the first sensor data being relatively low may include means for reducing a frame rate of data capture of the first sensor in response to receiving an indication of reduced power availability. A data difference score between frames of the first sensor data may be established, where means for reducing the frame rate of data capture of the first sensor in response to the data difference score between frames of the first sensor data being relatively low may include means for reducing a frame rate of data capture of the first sensor in response to the data difference score between frames of the first sensor data failing to satisfy a predetermined value in response to receiving an indication to reduce power consumption.

The above summary is provided merely for purposes of summarizing some example embodiments to provide a basic understanding of some aspects of the invention. Accordingly, it will be appreciated that the above-described embodiments are merely examples and should not be construed to narrow the scope or spirit of the invention in any way. It will be appreciated that the scope of the invention encompasses many potential embodiments in addition to those here summarized, some of which will be further described below.

BRIEF DESCRIPTION OF THE DRAWINGS

Figure 1:
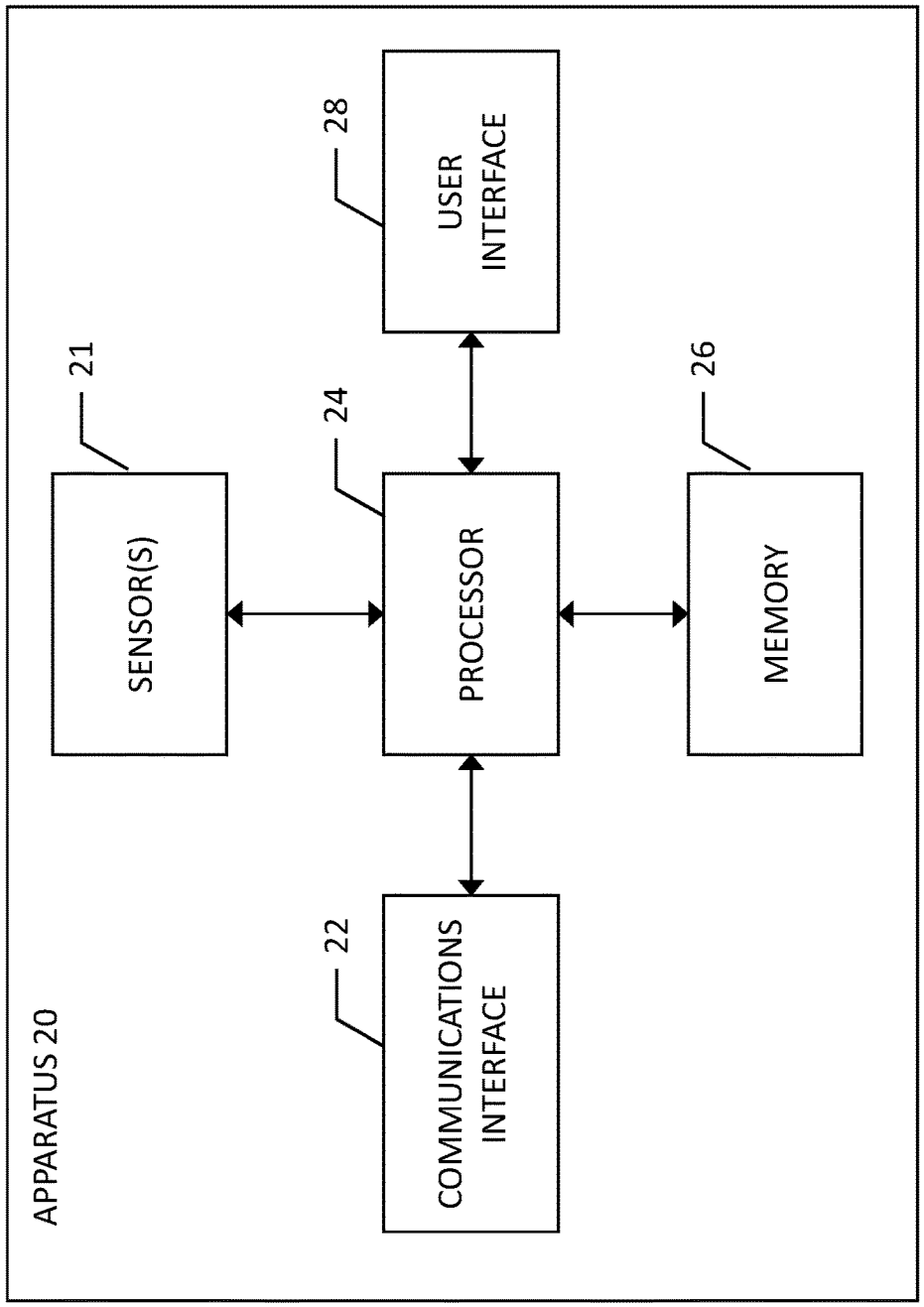
Figure 2:
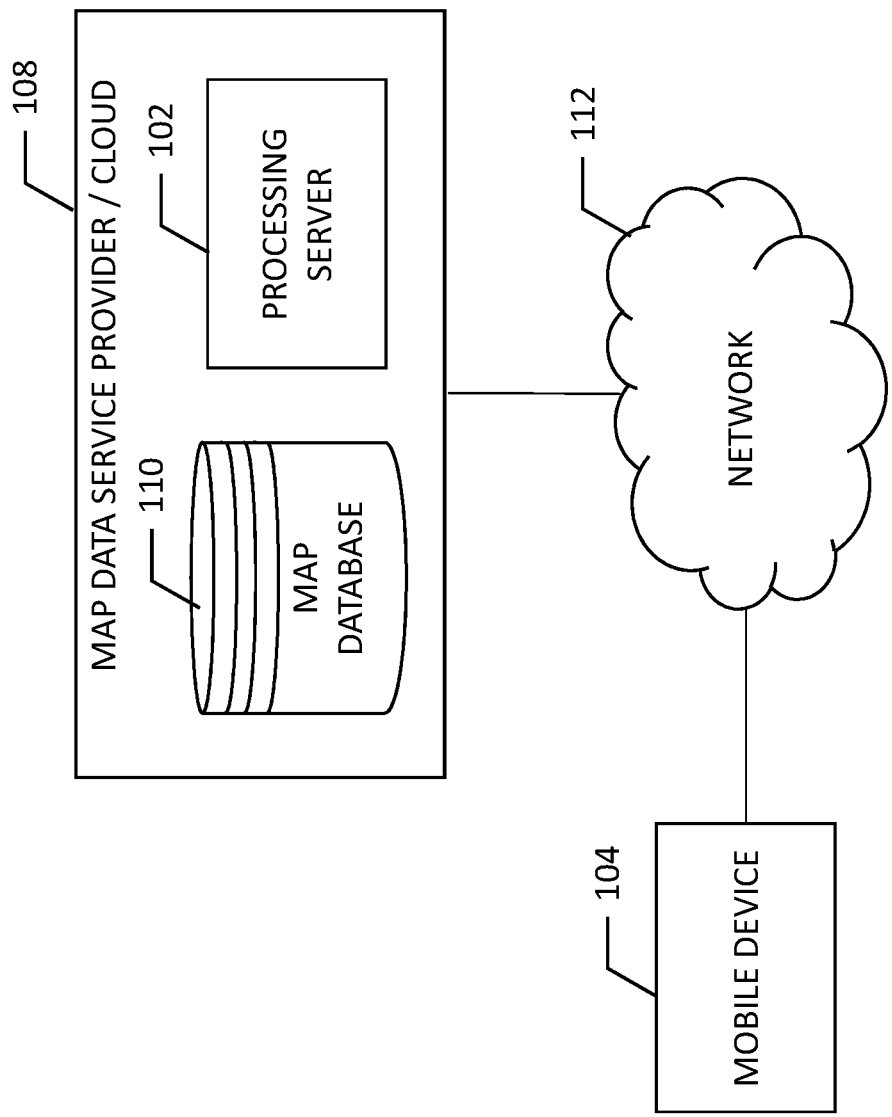
Figure 3:
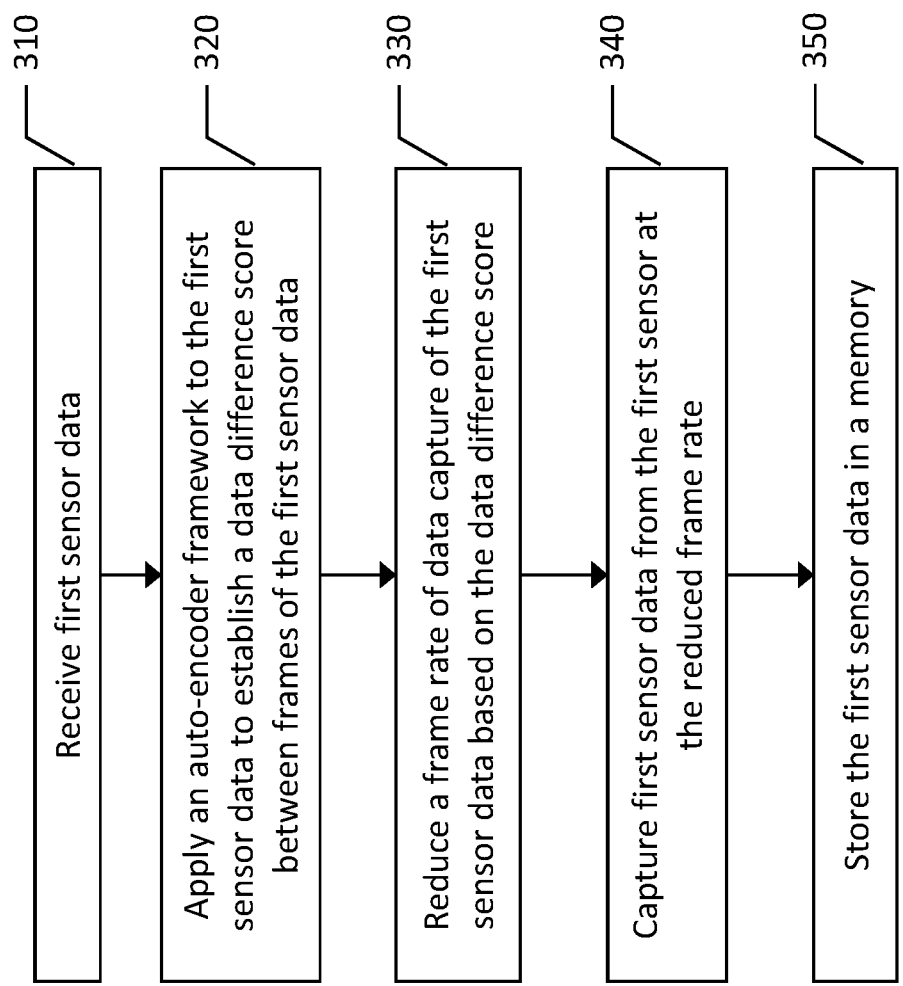

Having thus described certain example embodiments of the present invention in general terms, reference will hereinafter be made to the accompanying drawings which are not necessarily drawn to scale, and wherein:

FIG. 1 is a block diagram of an apparatus according to an example embodiment of the present disclosure;

FIG. 2 is a block diagram of a system for dynamically throttling processing and memory consumption of sensors based on context according to an example embodiment of the present disclosure; and FIG. 3 is a flowchart of operations for dynamically throttling processing and memory consumption of sensors based on context according to an example embodiment of the present disclosure.

DETAILED DESCRIPTION

Some embodiments of the present invention will now be described more fully hereinafter with reference to the accompanying drawings, in which some, but not all, embodiments of the invention are shown. Indeed, various embodiments of the invention may be embodied in many different forms and should not be construed as limited to the embodiments set forth herein; rather, these embodiments are provided so that this disclosure will satisfy applicable legal requirements. Like reference numerals refer to like elements throughout. As used herein, the terms "data," "content," "information," and similar terms may be used interchangeably to refer to data capable of being transmitted, received and/or stored in accordance with embodiments of the present invention. Thus, use of any such terms should not be taken to limit the spirit and scope of embodiments of the present invention.

A method, apparatus and computer program product are provided in accordance with an example embodiment of the present invention for regulating resource consumption by one or more sensors of a sensor array, and more particularly, to dynamically throttling processing and memory consumption of sensors based on context. Autonomous and semi-autonomous vehicles leverage sensor information to facilitate varying degrees of autonomous vehicle control. Vehicles, whether autonomous, semi-autonomous, or conventional, may be equipped with a plurality of sensors to enhance the driving experience and/or to facilitate varying degrees of autonomous vehicle control. Sensors, such as sensors 22 of apparatus 20 described further below, may include image sensors/cameras, Light Distancing and Ranging (LiDAR), Global Positioning Systems (GPS), Inertial Measurement Units (IMUs), or the like which may measure the surroundings of a vehicle and communicate information regarding the surroundings to a vehicle control module to process and adapt vehicle control accordingly.

With the increase in the volume of sensors and sensor types employed by vehicles, the power consumption of the sensors has become non-negligible. Exacerbating the issue is the need for high levels of efficiency, particularly with respect to pure electric vehicles and electric hybrid vehicles. While gasoline and diesel powered vehicles use an engine that is typically running at an inefficient speed producing excess heat and power that is dissipated through mechanical movement and heat loss, some of this energy was readily captured to power ancillary electronic components of a conventional vehicle. With the introduction of electric vehicles and hybrid vehicles, internal combustion engines are either not present, or not continuously running for substantially free parasitic electric current draw, such that electric power consumption has become a target for improvements in efficiencies.

Embodiments described herein relate to the use cases for power-constrained sensing as related to vehicles, and particularly semi-autonomous and autonomous vehicles which are generally equipped with sensors that represent a substantial power draw in addition to requiring substantial processing capacity and memory. The power consumption of the various electronic components and sensors of autonomous and semi-autonomous vehicles, in particular, is a substantial drain on the power resources of a vehicle and can adversely impact the drivable range of a vehicle. Embodiments described herein employ a technique whereby the power consumed by a sensing mechanism is dictated by a machine learning algorithm that optimizes power consumption based on context, such as the scene content of the sensors.

While power draw of sensors of sensor-equipped vehicles is substantial, memory requirements to store data generated from the sensors is also a significant issue. Sensor equipped vehicles are increasingly being used to generate crowd-sourced data that helps to build maps, such as high-definition HD maps, that can facilitate autonomous and semi-autonomous vehicle control, in addition to providing navigational assistance to manually driven vehicles. HD maps have a high precision at resolutions that may be down to several centimeters that identify objects proximate a road segment, and features of a road segment including lane widths, lane markings, traffic direction, speed limits, lane restrictions, etc. Autonomous and semi-autonomous vehicles use these HD maps to facilitate the autonomous control features, such as traveling within a lane of a road segment at a prescribed speed limit.

HD maps may be generated and updated based on sensor data from vehicles traveling along road segments of a road network. These vehicles may have various degrees of autonomy and may be equipped with a variety of different levels of sensors. Sensors from fully autonomous vehicles, for example, may be used to update map data or generate new map data in a form of crowd-sourced data from vehicles traveling along road segments. Sensor data received can be compared against other sensor data relating to the images captured by sensors to establish the accuracy of sensor data and to confirm the position, size, shape, etc. of features and objects along the road segment.

In order to facilitate the crowd-sourced building of HD maps, sensor equipped vehicles may capture and store sensor data from an environment in order to help build or repair HD maps. Further, these sensors can be capable of generating highly detailed data relating to the environment to build, update, and repair the HD maps. Sensors having greater capabilities, and greater numbers of sensors, leads to copious amounts of data that is generated from the sensors and may be stored locally on a vehicle. This storage can consume large amounts of memory in a short amount of time, such that memory capacity and consumption becomes a significant issue with respect to such sensor-equipped vehicles.

FIG. 1 is a schematic diagram of an example apparatus configured for performing any of the operations described herein. Apparatus 20 is an example embodiment that may be embodied by or associated with any of a variety of computing devices that include or are otherwise associated with a device configured for providing advanced driver assistance features which may include a navigation system user interface. For example, the computing device may be an Advanced Driver Assistance System module (ADAS) which may at least partially control autonomous or semi-autonomous features of a vehicle. However, as embodiments described herein may optionally be used in the process of map generation, map updating, and map accuracy confirmation using sensors powered by a power supply, embodiments of the apparatus may be embodied or partially embodied as a mobile terminal, such as a personal digital assistant (PDA), mobile telephone, smart phone, personal navigation device, tablet computer or any combination of the aforementioned systems. In a preferred embodiment where some level of vehicle autonomy is involved, the apparatus 20 is embodied or partially embodied by an electronic control unit of a vehicle that supports safety-critical systems such as the powertrain (engine, transmission, electric drive motors, etc.), steering (e.g., steering assist or steer-by-wire), and braking (e.g., brake assist or brake-by-wire). Optionally, the computing device may be a fixed computing device, such as a built-in vehicular navigation device, assisted driving device, or the like.

Optionally, the apparatus may be embodied by or associated with a plurality of computing devices that are in communication with or otherwise networked with one another such that the various functions performed by the apparatus may be divided between the plurality of computing devices that operate in collaboration with one another.

The apparatus 20 may be equipped or associated with any number of sensors 21, such as a global positioning system (GPS), accelerometer, LiDAR, radar, and/or gyroscope. Any of the sensors may be used to sense information regarding the movement, positioning, or orientation of the device for use in navigation assistance, as described herein according to example embodiments. In some example embodiments, such sensors may be implemented in a vehicle or other remote apparatus, and the information detected may be transmitted to the apparatus 20, such as by near field communication (NFC) including, but not limited to, Bluetooth™ communication, or the like. The sensor(s) 21 may be powered by a power supply of a vehicle.

The apparatus 20 may include, be associated with, or may otherwise be in communication with a communication interface 22, processor 24, a memory device 26 and a user interface 28. In some embodiments, the processor (and/or co-processors or any other processing circuitry assisting or otherwise associated with the processor) may be in communication with the memory device via a bus for passing information among components of the apparatus. The memory device may be non-transitory and may include, for example, one or more volatile and/or non-volatile memories. In other words, for example, the memory device may be an electronic storage device (for example, a computer readable storage medium) comprising gates configured to store data (for example, bits) that may be retrievable by a machine (for example, a computing device such as the processor). The memory device may be configured to store information, data, content, applications, instructions, or the like for enabling the apparatus to carry out various functions in accordance with an example embodiment of the present invention. For example, the memory device could be configured to buffer input data for processing by the processor. Additionally or alternatively, the memory device could be configured to store instructions for execution by the processor.

The processor 24 may be embodied in a number of different ways. For example, the processor may be embodied as one or more of various hardware processing means such as a coprocessor, a microprocessor, a controller, a digital signal processor (DSP), a processing element with or without an accompanying DSP, or various other processing circuitry including integrated circuits such as, for example, an ASIC (application specific integrated circuit), an FPGA (field programmable gate array), a microcontroller unit (MCU), a hardware accelerator, a special-purpose computer chip, or the like. As such, in some embodiments, the processor may include one or more processing cores configured to perform independently. A multi-core processor may enable multiprocessing within a single physical package. Additionally or alternatively, the processor may include one or more processors configured in tandem via the bus to enable independent execution of instructions, pipelining and/or multithreading.

In an example embodiment, the processor 24 may be configured to execute instructions stored in the memory device 26 or otherwise accessible to the processor. Alternatively or additionally, the processor may be configured to execute hard coded functionality. As such, whether configured by hardware or software methods, or by a combination thereof, the processor may represent an entity (for example, physically embodied in circuitry) capable of performing operations according to an embodiment of the present invention while configured accordingly. Thus, for example, when the processor is embodied as an ASIC, FPGA or the like, the processor may be specifically configured hardware for conducting the operations described herein. Alternatively, as another example, when the processor is embodied as an executor of software instructions, the instructions may specifically configure the processor to perform the algorithms and/or operations described herein when the instructions are executed. However, in some cases, the processor may be a processor of a specific device (for example, the computing device) configured to employ an embodiment of the present invention by further configuration of the processor by instructions for performing the algorithms and/or operations described herein. The processor may include, among other things, a clock, an arithmetic logic unit (ALU) and logic gates configured to support operation of the processor.

The apparatus 20 of an example embodiment may also include or otherwise be in communication with a user interface 28. The user interface may include a touch screen display, a speaker, physical buttons, and/or other input/output mechanisms. In an example embodiment, the processor 24 may comprise user interface circuitry configured to control at least some functions of one or more input/output mechanisms. The processor and/or user interface circuitry comprising the processor may be configured to control one or more functions of one or more input/output mechanisms through computer program instructions (for example, software and/or firmware) stored on a memory accessible to the processor (for example, memory device 24, and/or the like). In this regard, the apparatus 20 may interpret positioning data collected by its sensors and provide a destination preview including visual and audio feedback, to a user, for example.

The apparatus 20 of an example embodiment may also optionally include a communication interface 22 that may be any means such as a device or circuitry embodied in either hardware or a combination of hardware and software that is configured to receive and/or transmit data from/to other electronic devices in communication with the apparatus, such as by NFC, described above. Additionally or alternatively, the communication interface 22 may be configured to communicate over Global System for Mobile Communications (GSM), such as but not limited to Long Term Evolution (LTE). In this regard, the communication interface 22 may include, for example, an antenna (or multiple antennas) and supporting hardware and/or software for enabling communications with a wireless communication network. Additionally or alternatively, the communication interface 22 may include the circuitry for interacting with the antenna(s) to cause transmission of signals via the antenna(s) or to handle receipt of signals received via the antenna(s). In some environments, the communication interface 22 may alternatively or also support wired communication and/or may alternatively support vehicle to vehicle or vehicle to infrastructure wireless links.

The apparatus 20 may support a mapping or navigation application so as to present maps or otherwise provide navigation or driver assistance, such as in an example embodiment in which map data is created or updated using methods described herein. For example, the apparatus 20 may provide for display of a map and/or instructions for following a route within a network of roads via user interface 28. In order to support a mapping application, the computing device may include or otherwise be in communication with a geographic database, such as may be stored in memory 26. For example, the geographic database includes node data records, road segment or link data records, point of interest (POI) data records, and other data records. More, fewer or different data records can be provided. In one embodiment, the other data records include cartographic data records, routing data, and maneuver data. One or more portions, components, areas, layers, features, text, and/or symbols of the POI or event data can be stored in, linked to, and/or associated with one or more of these data records. For example, one or more portions of the POI, event data, or recorded route information can be matched with respective map or geographic records via position or GPS data associations (such as using known or future map matching or geo-coding techniques), for example.

In example embodiments, a navigation system user interface may be provided to provide driver assistance to a user traveling along a network of roadways whose geometry and details may be generated and/or updated according to methods described herein. Optionally, embodiments described herein may provide assistance for autonomous or semi-autonomous vehicle control. Autonomous vehicle control may include driverless vehicle capability where all vehicle functions are provided by software and hardware to safely drive the vehicle along a path identified by the vehicle. Semi-autonomous vehicle control may be any level of driver assistance from adaptive cruise control, to lane-keep assist, or the like. Identifying objects along road segments or road links that a vehicle may traverse, such as through sensors 21 of apparatus 20, may provide information useful to navigation and autonomous or semi-autonomous vehicle control by establishing barriers defining roadway width, identifying roadway curvature, or any boundary related details of the road links that may be traversed by the vehicle.

A map service provider database may be used to provide driver assistance via a navigation system and/or through an ADAS having autonomous or semi-autonomous vehicle control features. FIG. 2 illustrates a communication diagram of an example embodiment of a system for implementing example embodiments described herein. The illustrated embodiment of FIG. 2 includes a mobile device 104, which may be, for example, the apparatus 20 of FIG. 2, such as a mobile phone, an in-vehicle navigation system, an ADAS, or the like, and a map data service provider or cloud service 108. Each of the mobile device 104 and map data service provider 108 may be in communication with at least one of the other elements illustrated in FIG. 2 via a network 112, which may be any form of wireless or partially wireless network as will be described further below. Additional, different, or fewer components may be provided. For example, many mobile devices 104 may connect with the network 112. The map data service provider 108 may provide cloud-based services and/or may operate via a hosting server that receives, processes, and provides data to other elements of the system.

The map data service provider may include a map database 110 that may include node data, road segment data or link data, point of interest (POI) data, traffic data or the like. The map database 110 may also include cartographic data, routing data, and/or maneuvering data. According to some example embodiments, the road segment data records may be links or segments representing roads, streets, or paths, as may be used in calculating a route or recorded route information for determination of one or more personalized routes. The node data may be end points corresponding to the respective links or segments of road segment data. The road link data and the node data may represent a road network, such as used by vehicles, cars, trucks, buses, motorcycles, and/or other entities. Optionally, the map database 110 may contain path segment and node data records or other data that may represent pedestrian paths or areas in addition to or instead of the vehicle road record data, for example. The road/link segments and nodes can be associated with attributes, such as geographic coordinates, street names, address ranges, speed limits, turn restrictions at intersections, and other navigation related attributes, as well as POIs, such as fueling stations, hotels, restaurants, museums, stadiums, offices, auto repair shops, buildings, stores, parks, etc. The map database 110 can include data about the POIs and their respective locations in the POI records. The map database 110 may include data about places, such as cities, towns, or other communities, and other geographic features such as bodies of water, mountain ranges, etc. Such place or feature data can be part of the POI data or can be associated with POIs or POI data records (such as a data point used for displaying or representing a position of a city). In addition, the map database 110 can include event data (e.g., traffic incidents, construction activities, scheduled events, unscheduled events, etc.) associated with the POI data records or other records of the map database 110.

The map database 110 may be maintained by a content provider e.g., the map data service provider and may be accessed, for example, by the content or service provider processing server 102. By way of example, the map data service provider can collect geographic data and dynamic data to generate and enhance the map database 110 and dynamic data such as traffic-related data contained therein. There can be different ways used by the map developer to collect data. These ways can include obtaining data from other sources, such as municipalities or respective geographic authorities, such as via global information system databases. In addition, the map developer can employ field personnel to travel by vehicle along roads throughout the geographic region to observe features and/or record information about them, for example. Also, remote sensing, such as aerial or satellite photography and/or LiDAR, can be used to generate map geometries directly or through machine learning as described herein. However, the most ubiquitous form of data that may be available is vehicle data provided by vehicles, such as mobile device 104, as they travel the roads throughout a region.

The map database 110 may be a master map database, such as an HD map database, stored in a format that facilitates updates, maintenance, and development. For example, the master map database or data in the master map database can be in an Oracle spatial format or other spatial format, such as for development or production purposes. The Oracle spatial format or development/production database can be compiled into a delivery format, such as a geographic data files (GDF) format. The data in the production and/or delivery formats can be compiled or further compiled to form geographic database products or databases, which can be used in end user navigation devices or systems.

For example, geographic data may be compiled (such as into a platform specification format (PSF) format) to organize and/or configure the data for performing navigation-related functions and/or services, such as route calculation, route guidance, map display, speed calculation, distance and travel time functions, and other functions, by a navigation device, such as by a vehicle represented by mobile device 104, for example. The navigation-related functions can correspond to vehicle navigation, pedestrian navigation, or other types of navigation. The compilation to produce the end user databases can be performed by a party or entity separate from the map developer. For example, a customer of the map developer, such as a navigation device developer or other end user device developer, can perform compilation on a received map database in a delivery format to produce one or more compiled navigation databases.

As mentioned above, the map data service provider 108 map database 110 may be a master geographic database, but in alternate embodiments, a client side map database may represent a compiled navigation database that may be used in or with end user devices (e.g., mobile device 104) to provide navigation and/or map-related functions. For example, the map database 110 may be used with the mobile device 104 to provide an end user with navigation features. In such a case, the map database 110 can be downloaded or stored on the end user device which can access the map database 110 through a wireless or wired connection, such as via a processing server 102 and/or the network 112, for example.

In one embodiment, as noted above, the end user device or mobile device 104 can be embodied by the apparatus 20 of FIG. 1 and can include an Advanced Driver Assistance System (ADAS) which may include an infotainment in-vehicle system or an in-vehicle navigation system, and/or devices such as a personal navigation device (PND), a portable navigation device, a cellular telephone, a smart phone, a personal digital assistant (PDA), a watch, a camera, a computer, and/or other device that can perform navigation-related functions, such as digital routing and map display. An end user can use the mobile device 104 for navigation and map functions such as guidance and map display, for example, and for determination of useful driver assistance information, according to some example embodiments.

Autonomous driving has become a focus of recent technology with recent advances in machine learning, computer vision, and computing power able to conduct real-time mapping and sensing of a vehicle's environment. Sensing may be performed, for example, by sensors 21 of apparatus 20. Such an understanding of the environment enables autonomous driving in two distinct ways. Primarily, real-time or near real-time sensing of the environment may provide information about potential obstacles, the behavior of others on the roadway, and areas that are navigable by the vehicle. An understanding of where other cars are and what they may do is critical for a vehicle (or apparatus 20) to safely plan a route. Further, vehicles must be able to avoid both static and dynamic obstacles, which may change presence and position in real-time. Autonomous vehicles must also have a semantic understanding of what areas are around them that are navigable and safe for driving. Maps, such as HD maps described above, of areas may exist with very high levels of granularity to help facilitate navigation for autonomous vehicles; however, exceptions will occur in which a vehicle may need to deviate from a roadway to avoid a collision or where a road's geometry or other map attributes (e.g., direction) have changed.

Vehicles, and particularly autonomous and semi-autonomous vehicles, rely heavily on sensor data generated by sensors associated with a vehicle, such as sensors 21 of apparatus 20. As sensor arrays become more complex enabling greater autonomy of vehicles to which they are associated, the power required to drive these sensors becomes greater such that it ceases to be a negligible power drain on a vehicle. Further, as noted above, with electric vehicles and hybrid electric vehicles, there is not a constantly-running engine to drive an alternator/generator for delivering a near-constant supply of parasitic electrical power such that electrical power consumption is subject to greater scrutiny when it can adversely and substantially affect the range of a vehicle. As such, embodiments described herein use machine learning to dynamically adjust the power consumption of sensors of a vehicle in a manner that is substantially transparent to the systems of the vehicle while maintaining a sufficient flow of sensed data from the sensors according to the context of the vehicle.

A challenge with standard sensor configurations is that the power consumption of a device/sensor is typically independent of the content of the scene or environment around the vehicle from which sensor data is being generated/captured, which may be referred to as a context of the vehicle. For example, a stationary vehicle equipped with a camera captures images of a scene at a constant frame rate, even though the content of the scene remains unchanged from one captured frame to another. The constant frame rate leads to two issues. The first is that on-board storage of sensed data, in this case captured image frames, is used for storing substantially redundant data of a near-constant scene, and the limited storage volume fills without gaining any substantial benefit from the repeated capture of a scene across multiple frames. The second issue is that on-board power consumption continues while the vehicle is stationary and the sensor is actively collecting data of the environment. This power consumption may limit the distance the vehicle is able to travel with a battery that is used to power the sensors, and limited by data captured to a lower range due to the nature of storage of raw sensor data at constant frame rates.

Embodiments described herein dynamically adjust the power consumption and memory consumption of sensors through adjusting the data capture rate of sensors based on their context and the data the sensors are capturing. Example embodiments of the present disclosure use a deep neural network to predict context changes that can be inferred given the current scene and environment of the sensors. If the magnitude of content change in data from the sensors is large, such as the case of driving at a relative high speed in a dense, urban environment, the sensor framerate, resolution, and other relevant parameters may be increased. For scenes that are relatively static, such as when a vehicle is inching along in heavy traffic, the framework of example embodiments ensures that the sensing mechanism reduces framerate of capture and/or resolution, leading to less redundant data storage in memory and a reduced power consumption of the sensors, such that a range of coverage of the platform may be increased.

Embodiments of the present disclosure may be implemented on a wide variety of sensors and sensor configurations, such as image sensors or cameras, LiDAR sensors, radar sensors, etc. However, an example embodiment described herein includes an image sensing camera, though the accompanying disclosure is understood to be applicable to a variety of sensors.

As described herein, embodiments may use a deep neural network to learn and to predict context changes that can be inferred given sensor data captured. A training data set may be generated from crowd sourced vehicle sensor data captured from vehicles driving among a road network. This crowd sourced data may be, for example, vehicle sensor data, which may include video footage of road scenes and static scenes from a plurality of sensor-equipped vehicles traveling within a network of roadways. The data streams may provide a collection of video feeds of vehicles within a network of roads. Optionally, a sensor-equipped vehicle employed by a map data service provider may be considered "true data" as it is generated from a known sensor array with that is reliably calibrated and able to discern a highly accurate location, may be used to capture data which may serve as a proxy for a continuous data stream.

For a specific video-feed, a frame differencing approach may be used as a direct measure of the amount of change in a scene in order to establish the value of data captured and whether the data is redundant. Frame differencing measures the difference between frames of a video feed, where each frame is a static image of the environment. For a static scene, the frame differencing is nearly zero except for dynamic objects which may be present in the scene, such as other vehicles driving through a scene, pedestrians walking, foliage blowing, etc.

An auto-encoder framework may be trained using the aforementioned data and used to predict the frame difference between two scenes, and the difference between two scenes may be used to interpolate the next scene that is anticipated by the sensor. If the next scene is relatively static, the sensing framerate is dropped linearly, and the sensing resolution may be reduced, resulting in lower power consumption for static scenes. In the case that the frame difference is large, the predicted frame may have highly variable content, and the resolution is maximized while the framerate is increased.

According to an example embodiment, a sensor-equipped vehicle may be traveling along a road segment. The road segment may be a straight section of road in a rural area with no traffic. In such an embodiment, the scene viewed from the vehicle or the environment of the vehicle may change very little while the vehicle travels along the road segment. The sensed data of the environment, such as from sensor 21 of apparatus 20 may capture an image of the environment. The captured image may be processed, such as at processor 24 of apparatus 20, by an auto-encoder framework to predict differences between frames of the sensor data, or said differently, the difference between a first image captured by the sensor and a subsequent image captured by the sensor. In the described embodiment, the frame difference is very low, such that actions described herein may be taken to reduce power and memory consumption of the apparatus 20.

A first action may be to reduce the frame rate of the sensor. Reducing the frame rate from 30 frames per second or 30 Hertz to one frame per second if the frame difference score is very low. Such a change would reduce power consumption substantially, and reduce the captured data by 97%, resulting in a substantial savings in memory for storing the sensed data. The amount of reduction of the frame rate of a sensor may be variable, and may be based on the frame difference score. A relatively very low frame difference score may correspond to a maximum frame rate reduction of a sensor, while a relatively moderate frame difference score may result in a frame rate reduction that is more moderate, such as a 50% frame rate reduction. In the event that a frame difference score is high, indicating substantial differences from frame to frame of sensed data, the frame rate may be relatively high, and may even be increased over a conventional frame rate if the frame differences suggest that a higher frame rate would capture valuable data.

The frame rate reduction may be based, for example, on the frame difference score. The frame difference score may be captured based on the auto-encoder between sequential frames captured by a sensor. The frame rate may be adjustable such that the frame difference score between sequential frames may be maintained. In an example embodiment, a scene in which the frame difference score between frames captured at 30 Hz is very low, but the frame difference score between frames captured at 1 Hz may be very high. In such an embodiment, the frame rate may be adjusted such that the frame difference score between sequential frames is at a predefined value, allowing for dynamic frame rate adjustment of a sensor in order to maximize the value of the data captured, while minimizing power consumption and memory consumption.

A second action which may be taken in response to a low frame difference score may be to reduce the resolution of the sensor data. For example, in an instance in which the frame reference score is relatively very low, high resolution data capture may be unnecessary as details of the scene/environment may be substantially redundant and may not provide valuable data. In such an embodiment, resolution of the captured data may be reduced. This reduction may substantially reduce the memory required to store captured sensor data, thereby preserving memory for more value-added data in which high resolution capture may provide informative information relating to the environment of the vehicle.

The methods described herein to reduce power consumption by sensors of a sensor-equipped vehicle and to reduce the amount of data captured for storage may be implemented in the absence of a necessity to reduce power consumption or to reduce memory consumption. However, according to some embodiments, the reduction in frame rate of sensor data capture and/or the reduction in resolution of data capture may be performed based on necessity. For example, a vehicle that is in a range-extending mode of reduced power consumption may require sensor data capture to be at reduced frame rates and/or reduced resolutions when appropriate (e.g., when the frame difference score is low) to allow for an extended range of the vehicle through reduced power consumption. Optionally, a vehicle that is running low on power may require sensor data capture to be at reduced rates or resolutions.

According to some embodiments, the frame difference score used to reduce the sensor data capture frame rate and/or resolution may be variable, and may be dependent upon the power consumption requirements of a vehicle. In an instance in which a vehicle has low available power or necessitates power conservation, the frame difference score used to reduce the sensor data capture frame rate and/or resolution may be increased, such that a reduction in frame rate and/or resolution may occur at a higher frame difference score to encourage frame rate and/or resolution reduction more often in an effort to reduce power consumption and/or memory use.

FIG. 3 illustrates a flowchart depicting a method according to an example embodiment of the present invention. It will be understood that each block of the flowcharts and combination of blocks in the flowcharts may be implemented by various means, such as hardware, firmware, processor, circuitry, and/or other communication devices associated with execution of software including one or more computer program instructions. For example, one or more of the procedures described above may be embodied by computer program instructions. In this regard, the computer program instructions which embody the procedures described above may be stored by a memory device 26 of an apparatus employing an embodiment of the present invention and executed by a processor 24 of the apparatus 20. As will be appreciated, any such computer program instructions may be loaded onto a computer or other programmable apparatus (for example, hardware) to produce a machine, such that the resulting computer or other programmable apparatus implements the functions specified in the flowchart blocks. These computer program instructions may also be stored in a computer-readable memory that may direct a computer or other programmable apparatus to function in a particular manner, such that the instructions stored in the computer-readable memory produce an article of manufacture the execution of which implements the function specified in the flowchart blocks. The computer program instructions may also be loaded onto a computer or other programmable apparatus to cause a series of operations to be performed on the computer or other programmable apparatus to produce a computer-implemented process such that the instructions which execute on the computer or other programmable apparatus provide operations for implementing the functions specified in the flowchart blocks.

Accordingly, blocks of the flowcharts support combinations of means for performing the specified functions and combinations of operations for performing the specified functions for performing the specified functions. It will also be understood that one or more blocks of the flowcharts, and combinations of blocks in the flowcharts, can be implemented by special purpose hardware-based computer systems which perform the specified functions, or combinations of special purpose hardware and computer instructions.

FIG. 3 is a flowchart of a method for dynamically throttling processing and memory consumption of sensors based on context. As shown, first sensor data from a first sensor of a first sensor type may be received at 310. An auto-encoder framework is applied to the first sensor data at 320 to establish a data difference score between frames of the first sensor data. At 330, a frame rate of data capture of the first sensor data is reduced based on the data difference score. First sensor data is captured from the first sensor at the reduced frame rate at 340, and the first sensor data is stored at 350.

In an example embodiment, an apparatus for performing the method of FIG. 3 above may comprise a processor (e.g., the processor 24) configured to perform some or each of the operations (310-340) described above. The processor may, for example, be configured to perform the operations (310-340) by performing hardware implemented logical functions, executing stored instructions, or executing algorithms for performing each of the operations. Alternatively, the apparatus may comprise means for performing each of the operations described above. In this regard, according to an example embodiment, examples of means for performing operations 310-340 may comprise, for example, the processor 24 and/or a device or circuit for executing instructions or executing an algorithm for processing information as described above.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

That which is claimed:

1. An apparatus comprising at least one processor and at least one non-transitory memory including computer program code instructions, the computer program code instructions configured to, when executed, cause the apparatus to at least:
   receive first sensor data from a first sensor, wherein the first sensor data comprises data associated with an environment of the first sensor;
   apply an auto-encoder framework to the first sensor data to establish an indication of data difference between frames of the first sensor data, wherein a relatively high indication of data difference corresponds to substantial differences between frames of the first sensor data, and wherein an indication of relatively low data difference corresponds to insubstantial differences between frames of the first sensor data;
   reduce a resolution of data capture of the first sensor in response to the indication of data difference between frames of the first sensor data being relatively low;
   capture first sensor data from the first sensor at the reduced resolution; and
   provide for storage of first sensor data.

2. The apparatus of claim 1, wherein the first sensor data comprises image data and wherein frames of the first sensor data comprise temporally spaced image data from the first sensor.

3. The apparatus of claim 2, wherein the apparatus is further caused to:
   apply the auto-encoder framework to establish an indication of data difference between frames of the first sensor data captured at the reduced resolution; and
   increase a resolution of data capture of the first sensor in response to the indication of data difference between frames of the first sensor data captured at the reduced resolution being relatively high.

4. The apparatus of claim 1, wherein causing the apparatus to reduce the resolution of data capture of the first sensor in response to the indication of data difference between frames of the first sensor data being relatively low comprises causing the apparatus to reduce the resolution of data capture of the first sensor in response to receiving an indication of reduced power availability.

5. The apparatus of claim 1, wherein causing the apparatus to reduce the resolution of data capture of the first sensor in response to the indication of data difference between frames of the first sensor data being relatively low comprises causing the apparatus to reduce the resolution of data capture of the first sensor in response to the indication of data difference between frames of the first sensor data failing to satisfy a predetermined value.

6. The apparatus of claim 5, wherein the apparatus is further caused to increase the predetermined value in response to receiving an indication to reduce power consumption.

7. The apparatus of claim 1, wherein the apparatus is further caused to predict a frame difference between two frames of the first sensor data using the auto-encoder framework to generate a predicted indication of data difference between the two frames, wherein causing the apparatus to reduce a resolution of data capture of the first sensor in response to the indication of data difference between frames of the first sensor data being relatively low comprises causing the apparatus to reduce a resolution of data capture of the first sensor in response to the predicted indication of data difference between frames of the first sensor data being relatively low.

8. The apparatus of claim 1, wherein causing the apparatus to reduce the resolution of data capture of the first sensor in response to the indication of data difference between frames of the first sensor data being relatively low comprises causing the apparatus to reduce the resolution of data capture of the first sensor proportionally to the indication of data difference between frames of the first sensor data.

9. A computer program product comprising at least one non-transitory computer-readable storage medium having computer-executable program code instructions stored therein, the computer-executable program code instructions comprising program code instructions to:
receive first sensor data from a first sensor, wherein the first sensor data comprises data associated with an environment of the first sensor;
apply an auto-encoder framework to the first sensor data to establish an indication of data difference between frames of the first sensor data, wherein a relatively high indication of data difference corresponds to substantial differences between frames of the first sensor data, and wherein an indication of relatively low data difference corresponds to insubstantial differences between frames of the first sensor data;
reduce a resolution of data capture of the first sensor in response to the indication of data difference between frames of the first sensor data being relatively low;
capture first sensor data from the first sensor at the reduced resolution; and
provide for storage of first sensor data.

10. The computer program product of claim 9, wherein the first sensor data comprises image data and wherein frames of the first sensor data comprise temporally spaced image data from the first sensor.

11. The computer program product of claim 10, further comprising program code instructions to:
apply the auto-encoder framework to establish an indication of data difference between frames of the first sensor data captured at the reduced resolution; and
increase a resolution of data capture of the first sensor in response to the indication of data difference between frames of the first sensor data captured at the reduced resolution being relatively high.

12. The computer program product of claim 9, wherein the program code instructions to reduce the resolution of data capture of the first sensor in response to the indication of data difference between frames of the first sensor data being relatively low comprise program code instructions to reduce the resolution of data capture of the first sensor in response to receiving an indication of reduced power availability.

13. The computer program product of claim 9, wherein the program code instructions to reduce the resolution of data capture of the first sensor in response to the indication of data difference between frames of the first sensor data being relatively low comprise program code instructions to reduce the resolution of data capture of the first sensor in response to the indication of data difference between frames of the first sensor data failing to satisfy a predetermined value.

14. The computer program product of claim 13, further comprising program code instructions to increase the predetermined value in response to receiving an indication to reduce power consumption.

15. The computer program product of claim 9, further comprising program code instructions to predict a frame difference between two frames of the first sensor data using the auto-encoder framework to generate a predicted indication of data difference between the two frames, wherein the program code instructions to reduce a resolution of data capture of the first sensor in response to the indication of data difference between frames of the first sensor data being relatively low comprise program code instructions to reduce a resolution of data capture of the first sensor in response to the predicted indication of data difference between frames of the first sensor data being relatively low.

16. The computer program product of claim 9, wherein the program code instructions to reduce the resolution of data capture of the first sensor in response to the indication of data difference between frames of the first sensor data being relatively low comprise program code instructions to reduce the resolution of data capture of the first sensor proportionally to the indication of data difference between frames of the first sensor data.

17. A method comprising:
receiving first sensor data from a first sensor, wherein the first sensor data comprises data associated with an environment of the first sensor;
applying an auto-encoder framework to the first sensor data to establish an indication of data difference between frames of the first sensor data, wherein a relatively high indication of data difference corresponds to substantial differences between frames of the first sensor data, and wherein an indication of relatively low data difference corresponds to insubstantial differences between frames of the first sensor data;
reducing a resolution of data capture of the first sensor in response to the indication of data difference between frames of the first sensor data being relatively low;
capturing first sensor data from the first sensor at the reduced resolution; and
providing for storage of first sensor data.

18. The method of claim 17, wherein the first sensor data comprises image data and wherein frames of the first sensor data comprise temporally spaced image data from the first sensor.

19. The method of claim 18, further comprising:
applying the auto-encoder framework to establish an indication of data difference between frames of the first sensor data captured at the reduced resolution; and
increasing a resolution of data capture of the first sensor in response to the indication of data difference between frames of the first sensor data captured at the reduced resolution being relatively high.

20. The method of claim 17, wherein reducing the resolution of data capture of the first sensor in response to the indication of data difference between frames of the first sensor data being relatively low comprises reducing the resolution of data capture of the first sensor in response to receiving an indication of reduced power availability.

21. The method of claim 17, wherein reducing the resolution of data capture of the first sensor in response to the indication of data difference between frames of the first sensor data being relatively low comprises reducing the resolution of data capture of the first sensor in response to the indication of data difference between frames of the first sensor data failing to satisfy a predetermined value.

\* \* \* \* \*